Feb. 5, 1952           O. W. DENNY           2,584,561
AUXILIARY STEERING DEVICE FOR TOY VEHICLES
Filed April 10, 1948           2 SHEETS—SHEET 1
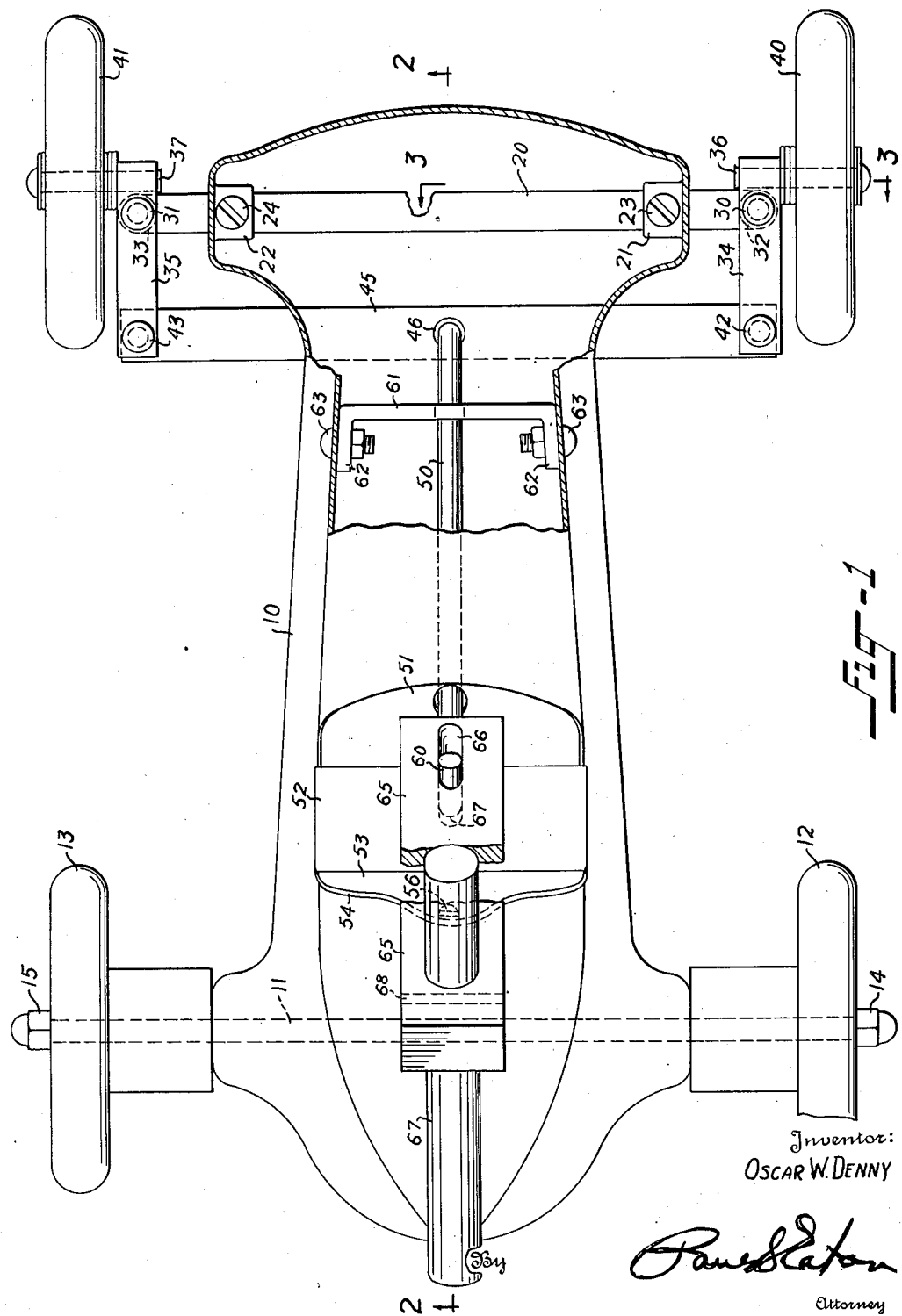
Inventor:
OSCAR W. DENNY

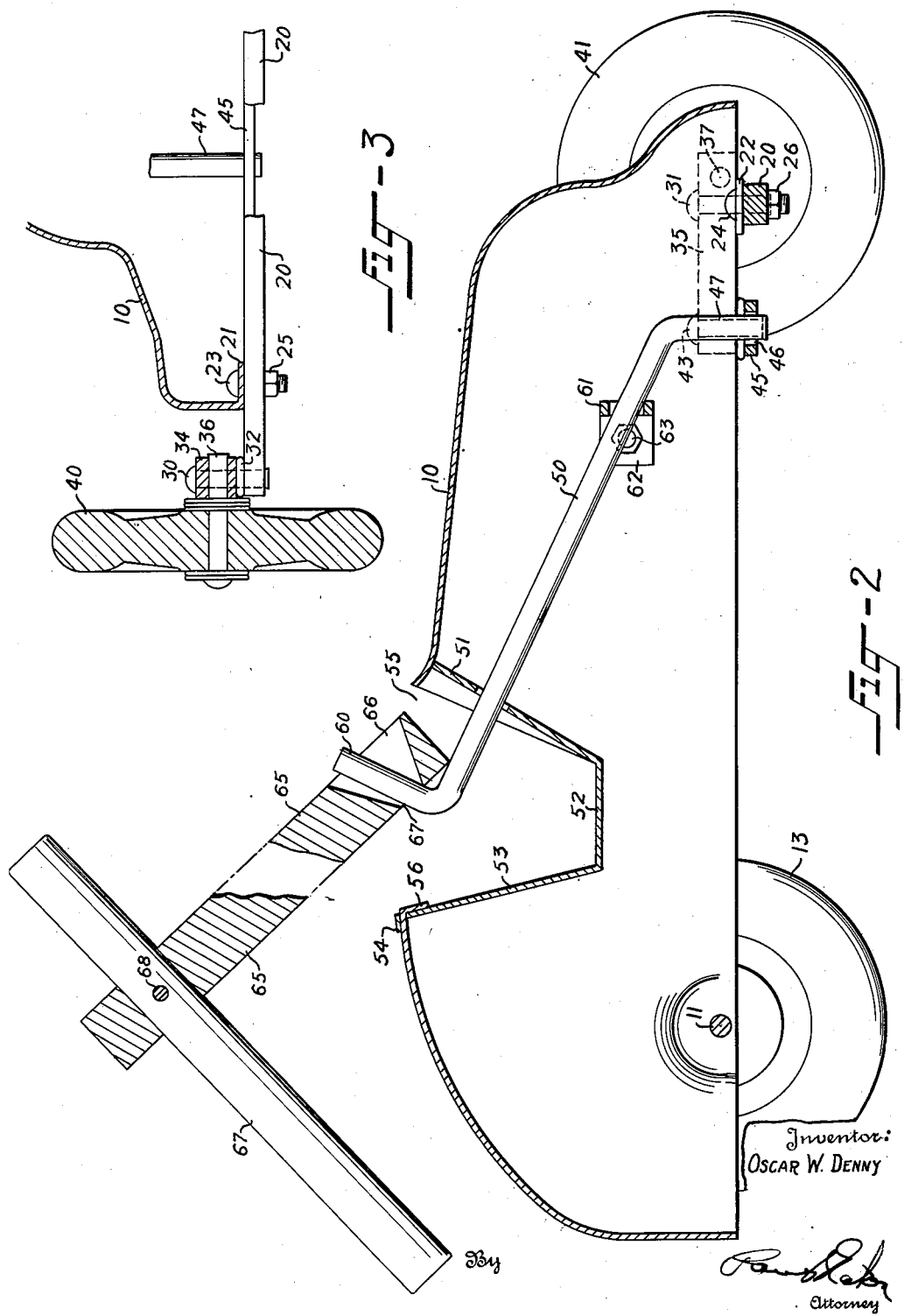

Patented Feb. 5, 1952

2,584,561

UNITED STATES PATENT OFFICE 2,584,561

AUXILIARY STEERING DEVICE FOR TOY VEHICLES

Oscar W. Denny, Greensboro, N. C.

Application April 10, 1948, Serial No. 20,224

1 Claim. (Cl. 46—201)

This invention relates to improvements in a toy vehicle.

It is an object of this invention to provide a toy vehicle imitative of a miniature automobile, said vehicle, having a means connected to the front wheels for steering the front wheels, said means extending upwardly through the vehicle and having an extension handle pivotally connected thereto, said extension handle being adapted to be grasped by a person for propelling the vehicle and by turning the extension handle on its longitudinal axis, one way or the other, as desired, the person may steer the front wheels of the vehicle.

Thus, with these ends in view, it is apparent that the moral effect on the operator of this type of vehicle would be such that the operator of the vehicle would feel as though said operator were actually driving an automobile of much larger dimensions and could well imagine one's self sitting within the automobile although the operator of the automobile would be walking and pushing the vehicle.

Some of the objects of the invention having been stated, other objects will appear as the description proceeds when taken in connection with the accompanying drawings, in which Figure 1 is a top plan view of a toy vehicle with parts broken away and showing this invention applied thereto;

Figure 2 is a vertical sectional view taken along the line 2—2 in Figure 1;

Figure 3 is a vertical sectional view taken substantially along the line 3—3 in Figure 1.

Referring more specifically to the drawings, the numeral 10 indicates a sheet metal body, which may be of any desired shape, but in this instance it is shown to be in the shape of a miniature racer. This body 10 is supported at its rear end on an axle 11 which penetrates the body 10 at each side thereof and this axle 11 has, rotatably mounted on each end thereof, ground wheels 12 and 13, which are confined on the axle 11 by nuts 14 and 15 respectively, which are threadably secured on the ends of the axle 11.

The front end of the body 10 is supported on a horizontally disposed transverse bar 20, the upper surface of which is engaged by inturned ears 21 and 22 and these are integral with the body 10. These inturned ears 21 and 22 are penetrated by screws 23 and 24, respectively, which also penetrate the transverse bar 20 and are secured to the same by nuts 25 and 26, respectively, which threadably engage the lower ends of the screws 23 and 24.

The transverse bar 20 extends beyond the remote vertical surfaces of the body 10 and the opposed ends of the horizontally disposed transverse bar 20 are penetrated by the lower ends of vertically disposed rivets 30 and 31 which extend upwardly. The upper surface of the horizontally disposed bar 20 is engaged by washers 32 and 33 which surround the rivets 30 and 31, respectively, and the upper surfaces of the washers 32 and 33 are engaged by longitudinally extending lever bars 34 and 35 which are pivotally mounted on the vertically disposed rivets 30 and 31.

The longitudinally extending lever bars 34 and 35 extend forwardly of the bar 20 and have fixedly mounted therein one end of axles 36 and 37 respectively. The axles 36 and 37 project outwardly from each of the bars 34 and 35 and have, rotatably mounted thereon, suitable ground wheels 40 and 41. The horizontally disposed lever bars 34 and 35 extend rearwardly and are slidably penetrated by vertically disposed rivets 42 and 43 respectively. These rivets 42 and 43 extend downwardly below the horizontally disposed bars 34 and 35 and are fixedly secured in a transverse steering link 45 which has a bore 46 therethrough which is penetrated by a vertically disposed portion 47 of an angularly disposed steering arm 50.

The angularly disposed steering arm 50 extends rearwardly and upwardly and loosely penetrates a bar 61 which has rearwardly turned ears 62 integral therewith and these ears 62 secure the bar 61 to the walls of the body 10, by any suitable means such as bolts 63 and this bar 60 serves to support the steering arm 50.

The steering arm 50 extends rearwardly at an angle and loosely penetrates a dash board 51 disposed in the body 10. This dash board 51 is integral with a horizontally disposed floor portion 52 and this horizontally disposed floor portion 52 has extending rearwardly and upwardly therefrom a sheet metal portion 53 which is turned rearwardly as at 54 to thus secure the same in an opening 55 of the body 10. This upwardly extending portion 53 also has penetrating the same a downturned ear 56 of the body 10 to thus assist in securing the upwardly extending portion 53 and the dash board associated therewith, in the body 10. The steering arm 50 extends rearwardly of the dash board 51 and has an upturned portion 60 integral therewith.

This toy vehicle may be propelled by a child creeping along the floor on which the vehicle is disposed, and by turning the upwardly extending portion 60 of the steering arm 50 to the right or to the left, the child may move the front wheels for steering the same. However, inasmuch as it is necessary for one to stoop over or to creep along the floor when moving this vehicle, in its present form, I provide an extension arm 65 having an elongated slot 66 adjacent its lower end which is restricted at its lower end, as at 67, and this slot is penetrated by the upwardly extending portion 60 of the steering arm 50.

The purpose of the elongated slot 66, being restricted at its lower end as at 67, is to permit the person pushing this toy vehicle to vary the angle at which the extension arm 65 is held relative to the steering arm 50 and to retain control of the steering arm 50. The steering arm 65 may be of any desired length and it is penetrated, at its free end, by a transverse handle bar 67 which is secured in the arm 65 by any suitable means such as a dowel pin 68.

It is thus seen that by twisting the extension arm to the right or left along its longitudinal axis, the front wheels may be turned to steer the toy vehicle, as desired.

In the drawings and specification there has been set forth a preferred embodiment of the invention, and although specific terms are employed, they are used in a generic and descriptive sense only, and not for purposes of limitation, the scope of the invention being defined in the claim.

I claim:

In a toy vehicle having dirigible front wheels and having a steering rod for steering the front wheels, said steering rod extending upwardly and rearwardly and having a right angular crank portion on its upper end, whereby upon manual movement of said crank, the steering rod can be rotated on its own longitudinal axis for steering the front wheels of the toy vehicle, an extension steering shaft having a slot in its lower end for receiving the crank portion on the upper end of said steering rod, said slot being wider at the upper end thereof than at the lower end and having diverging side walls to permit variation of the angle at which the extension steering shaft is held relative to the steering rod, said extension steering shaft comprising a single shaft having a bore in the upper end thereof and being provided with a transverse member positioned in said bore for imparting rotation thereto, and whereby upon rotation of the extension steering shaft along its longitudinal axis, movement of the steering rod along its longitudinal axis may be effected.

OSCAR W. DENNY.

REFERENCES CITED

The following references are of record in the file of this patent:

UNITED STATES PATENTS

| Number | Name | Date |
|---|---|---|
| 941,471 | Thibert | Nov. 30, 1909 |
| 1,996,546 | Lindberg | Apr. 2, 1935 |
| 2,167,245 | Lohr et al. | July 25, 1939 |
| 2,260,679 | Neilson | Oct. 28, 1947 |

FOREIGN PATENTS

| Number | Country | Date |
|---|---|---|
| 640,129 | France | Mar. 24, 1928 |
| 698,487 | France | Nov. 23, 1930 |
| 141,331 | Austria | Nov. 15, 1934 |